United States Patent [19]
Akagiri

[11] Patent Number: 5,128,963
[45] Date of Patent: Jul. 7, 1992

[54] 3-MODE PCM/DPCM/APCM MAXIMIZING DYNAMIC RANGE

[75] Inventor: Kenzo Akagiri, Yokohama, Japan

[73] Assignee: Sony Corporation, Tokyo, Japan

[21] Appl. No.: 43,853

[22] Filed: Apr. 29, 1987

Related U.S. Application Data

[63] Continuation of Ser. No. 700,817, Jan. 31, 1985, abandoned.

[51] Int. Cl.$^5$ .................. H04B 14/04; H04B 14/06
[52] U.S. Cl. ......................... 375/25; 375/27; 375/34; 358/135
[58] Field of Search ................ 375/25, 27, 30, 31, 375/33, 34, 122; 358/13, 135; 381/29, 31; 371/37, 1; 332/9 R, 110

[56] References Cited

U.S. PATENT DOCUMENTS

| | | | |
|---|---|---|---|
| 3,403,226 | 9/1968 | Wintringham | 358/135 |
| 3,422,227 | 1/1969 | Brown | 358/135 |
| 3,439,753 | 4/1969 | Mounts et al. | 375/30 |
| 3,761,613 | 9/1973 | Limb | 375/25 |
| 4,281,346 | 7/1981 | Strobele | 375/34 |
| 4,354,273 | 10/1982 | Araseki et al. | 375/27 |
| 4,368,487 | 1/1983 | Sabri | 375/27 |
| 4,386,237 | 5/1983 | Virupaksha et al. | 375/14 X |
| 4,481,659 | 11/1984 | Adoul | 381/31 |
| 4,491,953 | 1/1985 | Bellisio et al. | 375/31 |

FOREIGN PATENT DOCUMENTS 1219972 6/1966 Fed. Rep. of Germany.

OTHER PUBLICATIONS

IEEE Transactions on Communications, Apr. 1982, pp. 769-779, (vol. COM-30, No. 4).
IBM Technical Disclosure Bulletin, Oct. 1973, vol. 16, No. 5, pp. 1404-1405.

Primary Examiner—Douglas W. Olms
Assistant Examiner—Ralph Smith
Attorney, Agent, or Firm—Hill, Van Santen, Steadman & Simpson

[57] ABSTRACT

It has been observed that the S/N ratio of differential-mode PCM and summation-mode PCM with respect to quantization noise is improved at low frequencies and high frequencies, respectively, and consequently the dynamic range thereof is increased. An input signal is divided into blocks of a predetermined number of bits, and, for each block, the one of the general-mode PCM, differential-mode PCM, and summation-mode PCM mode is selected in which adaptive encoding is most efficient, and consequently the quantization noise is smallest, and the input signal data in the mode selected for each block is transmitted together with a mode signal and an adaptive data signal, etc. It has also been observed that the closer to the main signal, the larger the masking effect on the sense of hearing, so that the S/N ratio in terms of the sense of hearing is improved by changing the noise spectrum during digitization to correspond to the spectrum of the input signal.

12 Claims, 14 Drawing Sheets

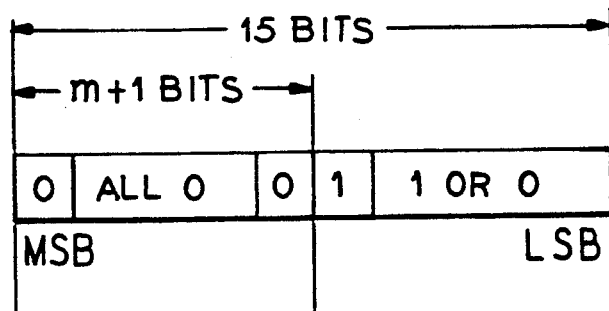
FIG. 13
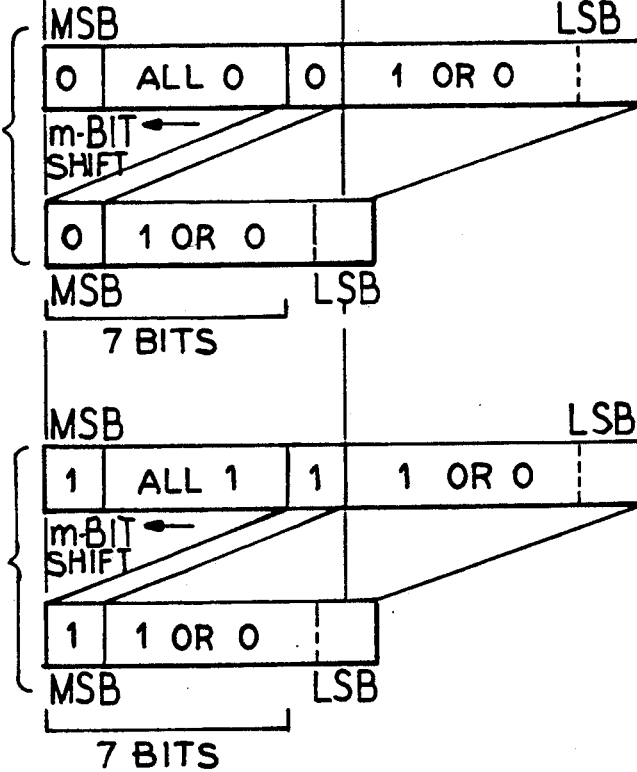
FIG. 14A
FIG. 14B
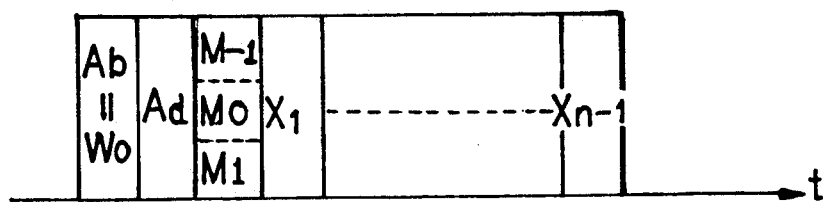
FIG. 15

3-MODE PCM/DPCM/APCM MAXIMIZING DYNAMIC RANGE

This is a continuation of application Ser. No. 700,817, filed Jan. 31, 1985, now abandoned.

TECHNICAL FIELD

This invention relates to a method and an apparatus for transmitting digital signals such as PCM signals and, more particularly, to such method and apparatus in which adaptively processed differential or additive PCM signals may be transmitted with a higher bit efficiency and under suppression of error propagation. More specifically, it relates to such method and apparatus in which one of the straight PCM, differential PCM or the additive PCM modes capable of providing for the maximum compression rate is selected for transmission and also in which adverse effects caused by transmission noises may be reduced.

BACKGROUND ART

With the recent progress in digital technology, it has become customary that analog signals such as audio or video signals are sampled at certain intervals and each sampled value is quantized and coded for providing pulse code modulated signals (so-called PCM signals) for transmission (or occasionally recording or reproduction).

It is known in general that, converting the analog signals into PCM digital signals for transmission, the higher the sampling frequency, the wider the bandwidth of the analog signal that can be transmitted and, the larger the number of bits for quantization, the larger the dynamic range of the output signal. Therefore, when it is desired to effect a digital transmission of the original analog signal with a high fidelity, viz. with a broad frequency range and a large dynamic range, it is necessary to use a high sampling frequency and a large number of bits for quantization, with the result that the number of bits transmitted in a unit time or the bit rate is necessarily increased.

However, the bit rate is limited not only by the properties of the transmission medium or occasionally the recording medium, but also by the digital signal processing speed available at the transmitting and receiving sides or occasionally at the recording and reproducing sides. Also in consideration of the cost performance and economy in supplying PCM signal recording and reproducing devices, it is critical to effect a high-quality signal transmission and occasionally recording or reproduction at as low a bit rate as possible.

For signal transmission at a relatively low bit rate and a relatively large dynamic range, it is known to use a differential PCM system or an adaptive differential PCM system. These systems, however, are susceptible to error propagation and, if it is desired to insure an acceptable error corrective ability, the effect of bit rate reduction may not be achieved because of increased redundancy. In the differential PCM system, the dynamic range larger than that possible with the conventional or straight PCM system can be obtained at a smaller number of bits for quantization in the low to medium frequency range of the input signal up to one-sixth of the sampling frequency. However, with the high frequency range of the input signal, the dynamic range of the differential PCM system may become lower than that of the straight PCM system. In addition, in the differential PCM system, the effect of transmission error tends to be demonstrated markedly while the sound quality may be degraded due to increased distortion factor.

In introduction of the adaptive PCM system, in which the bit length per word is reduced by having the quantizing step width changed in accordance with the input signal for reducing the bit rate without affecting the dynamic range, since the input digital signals with a longer bit length per word are adaptively processed for conversion into words of a shorter bit length or re-quantizated, there is such a defect as the increased quantization noise.

In view of such aspect as above described, it is therefore an object of the present invention to provide a method and an apparatus for transmission of digital signals, according to which the error propagation can be terminated in a shorter time, the effect of the dynamic range expansion is drastically improved by this means a coefficient for suppressing the error propagation is increased and the adaptive processing is intensified, and a high error corrective ability is achieved as the redundancy is kept low for the sake of a simple code construction.

It is another object of the present invention to provide a method and an apparatus for transmission of digital signals according to which a transmission mode best suited for transmission of input signals, for instance, one of the straight PCM, differential PCM and the additive PCM modes is selected for each of the temporally divided data blocks so as to provide the maximum transmission efficiency.

It is a further object of the present invention to provide a method and an apparatus for transmission of digital signals whereby a signal waveform exhibiting rapid changes in amplitude with time, may be transmitted, or recorded and/or reproduced, efficiently with a low bit rate.

It is another object of the present invention to provide a method and an apparatus for transmission of digital signal according to which, in view of the masking effect of hearing sense of the human, the quantization noise spectrum is changed as a function of the frequency spectrum of the input signals for providing the maximum masking effect so as to be able to reduce the apparent or auditory noise.

DISCLOSURE OF THE INVENTION

According to a feature of a method and an apparatus for transmission of digital signal of the present invention, at least two of the waveform instantaneous sample value data as straight PCM mode digital data, the difference data as differential PCM mode digital data and the sum data as additive PCM mode digital data, are outputted on the basis of sampled wave peak value data of input signals, these outputted data are compared to each other for specifying the mode capable of providing for the maximum compression rate, and the data of the mode capable of providing the maximum compression rate are selected and a plurality of words are outputted as one block. According to another feature of the present invention, there are provided a method and an apparatus for transmission of digital signal in which, when the difference or sum of a plurality of sampled values which are adjacent to each other in time base axis are digitized and transmitted, a plurality of words of the digital data obtained by adaptive processing of the difference or sum are arranged into one block and at least an information word indicative of the adaptive processing and digital data words indicative of the sampled values are included in each one block and transmitted. According to still another feature of the present invention, there are provided a method and an apparatus for transmission of digital signal in which, when the data based on sampled values of input signals are digitized and transmitted, the status of the frequency spectrum of the input signals is detected and the frequency spectrum of the digitizing noise is changed, wherein the noise spectrum are controlled to change as a function of a detected output so as to provide a noise spectrum related to the frequency spectrum of the input signals.

BRIEF DESCRIPTION OF THE DRAWINGS

FIG. 13 is a diagram showing an example of the word of the maximum absolute value;

FIGS. 14A, B are diagrams for explanation of the process of the adaptive operation;

FIG. 15 is a diagram showing an example of the word construction in one block;

BEST MODE FOR EXECUTING THE INVENTION

Before entering into description of the preferred embodiment of the present invention, description is first made of the difference between the conventional PCM, differential PCM and the additive PCM, and of the adaptive processing briefly.

Figure 1:
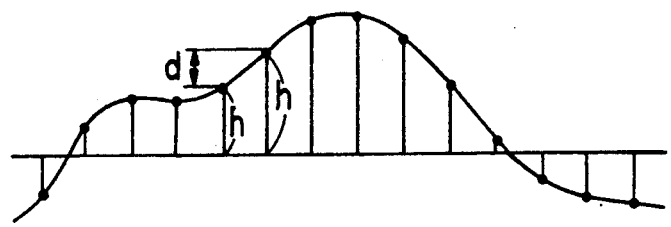
FIG. 1 is a waveform diagram for explanation of the wave peak value and the difference value caused by sequentially sampling an analog signal waveform.

First of all, the conventional or straight PCM and the differential PCM are explained. The input signals shown in FIG. 1 are sampled and the respective sampled wave peak values are quantized and encoded to straight PCM data, whereas the differences between the adjacent sampled values are quantized and encoded to differential PCM data. This differential processing can also be repeated a number of times to give high-order differential PCM data. When the input waveform is changed relatively, that is, when the input signal frequency is lower than the sampling frequency, the difference values are smaller than the sampled wave peak value so that a larger dynamic range may be achieved with the differential PCM than with the straight PCM under the same condition of the number of bits for quantization.

Let us consider the case in which the sinusoidal input signal of a constant frequency fi (angular frequency $\omega = 2\pi fi$) is sampled at a constant sampling frequency fs and the difference between the adjacent sampled values is found.

With the input signal is a function of time t such that $$f(t) = \sin\omega_i t \qquad (1)$$

the difference d(t) for a sampling period $Ts(=1/fs)$ is given by $$\begin{aligned} d(t) &= f(t) - f(t - Ts) \\ &= \sin\omega_i t - \sin\omega_i \left(t - \frac{1}{fs}\right) \end{aligned} \qquad (2)$$

Differentiating the equation (2) for finding a maximum value for d(t), $$d'(t) = \omega_i \left(1 - \cos\frac{\omega i}{fs}\right)\sin\omega_i t + \sin\frac{\omega i}{fs}\cos\omega_i t \qquad (3)$$

Letting the equation d'(t) be zero, $$\tan\omega_i t = \frac{1 - \cos\frac{\omega i}{fs}}{\sin\frac{\omega i}{fs}} \qquad (4)$$

From this equation (4), the following equation (5) is derived.

$$d(t) = \sqrt{\left(1 - \cos\frac{\omega i}{fs}\right)^2 + \sin^2\frac{\omega i}{fs}} \times \sin(\omega_i t + \phi) \qquad (5)$$

wherein $$\phi = \tan^{-1} \frac{1 - \cos\frac{\omega i}{fs}}{\sin\frac{\omega i}{fs}}$$

Thus, from the equation (5), the maximum value $d_{max}$ of d(t) is given by $$d_{max} = \sqrt{\left(1 - \cos\frac{\omega i}{fs}\right)^2 + \sin^2\frac{\omega i}{fs}} \quad (6)$$

$$= \sqrt{2 - 2\cos\frac{\omega i}{fs}}$$

Since the maximum value of the straight PCM data is the amplitude equal to the maximum sampled value, or the amplitude 1 in the equation (1), the input frequency fi1 for which the maximum value of the differential PCM data and the maximum value of the straight PCM data are equal can be found by letting $d_{max}$ in equation (6) be equal to unity. Thus, $$1 = \sqrt{2 - 2\cos\frac{\omega i1}{fs}}$$

$$2\cos\frac{\omega i1}{fs} = 1$$

$$\frac{\omega i1}{fs} = \cos^{-1}\frac{1}{2} = \frac{\pi}{3}$$

$$\therefore fi1 = \frac{\omega i1}{2\pi} = \frac{1}{2\pi} \cdot fs \cos^{-1}\frac{1}{2} = \frac{1}{6} fs \approx 0.167 fs \quad (7)$$

Therefore, it is when the input frequency fi is equal to 1/6 of the sampling frequency $f_s$ that the maximum value of the differential PCM data is equal to the maximum value of the straight PCM thus giving rise to the same dynamic range.

The adjacent sampled values can also be added together to give a sum or addition which is then quantized and encoded to an additive PCM data. The sum a(t) for the input sinusoidal signal f(t) is expressed by the following equation (8).

$$a(t) = f(t) + f(t - Ts) \quad (8)$$

$$= \sin\omega_i t + \sin\omega_i \left(t - \frac{1}{fs}\right)$$

The maximum value $a_{max}$ for this sum a(t) can be calculated as in the case of the difference mentioned hereinabove, and is given by $$a_{max} = \sqrt{2 + 2\frac{\omega i}{fs}} \quad (9)$$

Therefore, the input frequency fi2 for which the maximum value of the summing PCM and the maximum value of the straight PCM are equal is given by $$fi2 = \frac{\omega i2}{2\pi} = \frac{fs}{2\pi} \cos^{-1}\left(-\frac{1}{2}\right) = \frac{1}{3} fs \approx 0.333 fs \quad (10)$$

Thus, it is when the input frequency fi is equal to one-third of the sampling frequency that the maximum value of the additive PCM data is equal to the maximum value of the straight PCM data.

Figure 2:
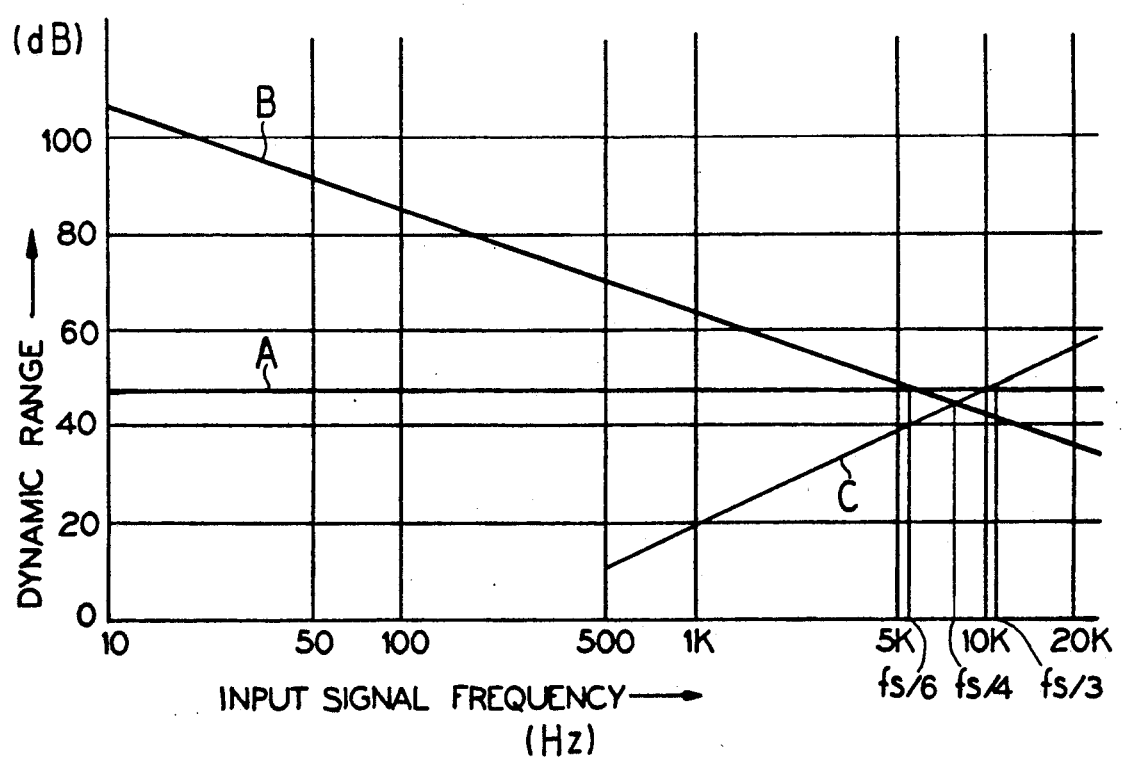
FIG. 2 is a chart showing frequency characteristics of the dynamic range of the straight, differential and additive PCM modes.

Thus, when the input signal is sampled at a predetermined sampling frequency and the aforementioned wave peak values, difference values and addition values are quantized by using the same number of bits for quantization, the resulting dynamic range is shown for example in FIG. 2, wherein the dB values of the dynamic range are plotted on the vertical axis and the input signal frequency fi is plotted on the horizontal axis. In FIG. 2, curves A, B and C represent characteristic curves for straight, differential and additive PCM modes for the sampling frequency fs equal to 32 kHz and the number of bits for quantization equal to 8, as an example. It may be seen from this figure that, for the input signal frequency fi lower than fs/6, the dynamic range of the differential PCM mode becomes largest which means that the compression efficiency is also maximum. Similarly, for the input signal frequency fi in the range from fs/6 to fs/3, the straight PCM mode has the largest dynamic range and hence the maximum compression efficiency and, for the input signal frequency fi higher than fs/3, the additive PCM mode has the largest dynamic range and hence the maximum compression efficiency.

In transmitting (or occasionally recording and/or reproducing) the digital data, such as the aforementioned differential PCM data or the like, it is known to make use of an adaptive processing according to which only a part of the total bits of the data is transmitted.

Figure 3:
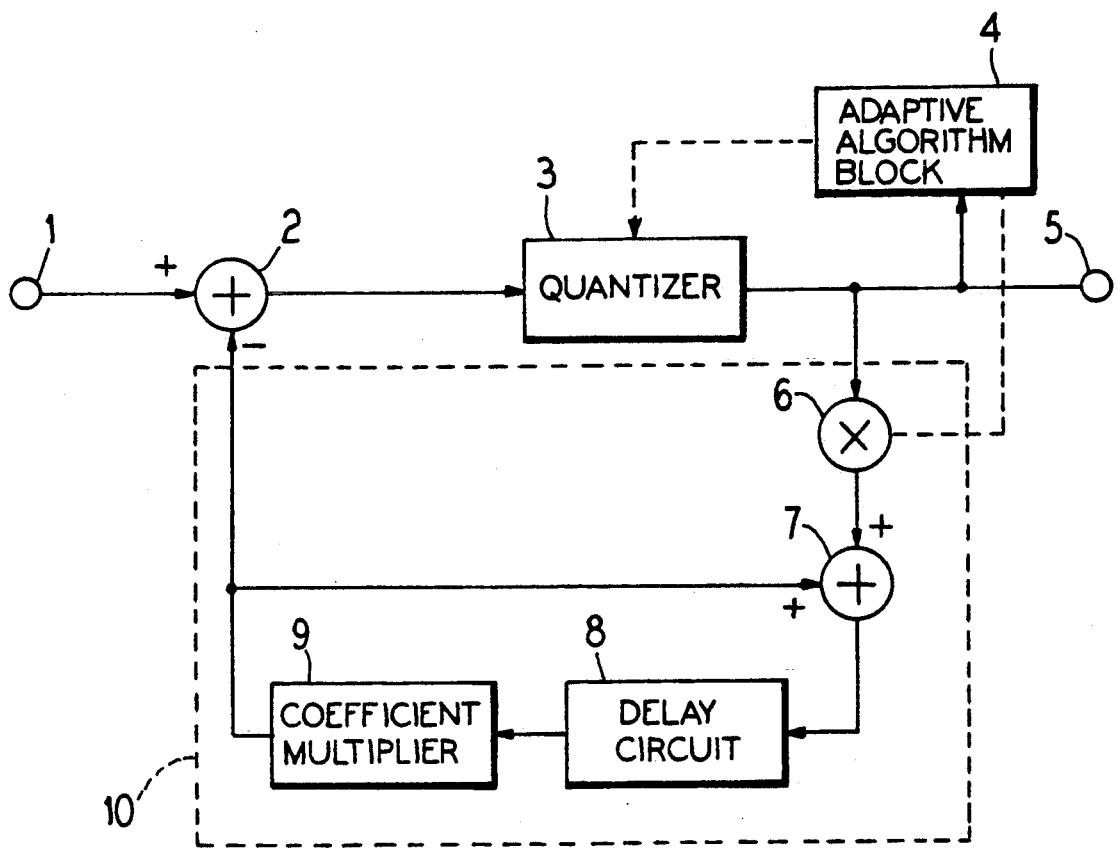
FIG. 3 is a block circuit diagram showing an example of the adaptive differential PCM encoder.

FIG. 3 shows an encoder for the adaptive differential PCM as an example. In FIG. 3, an input terminal 1 is supplied with digital signals which represent the quantized (and encoded) equivalent of the sampled values. These input digital signal are supplied to an adder 2 where the difference or error between the input data and an output from a local decoder 10 is obtained. The error signal from the adder 2 is re-quantized at a quantizer 3 to effect a so-called bit reduction for reducing the bit length per word so as to be supplied to an output terminal 5. An adaptive algorithm block 4 is used to effect an adaptive alteration in the characteristics of the quantizer 3 and the characteristics of a multiplier 6 that are complementary to those of the quantizer 3, for which various algorithms are proposed. The representative example may be such that the larger the output signal level, the larger the quantum step width of the quantizer 3. In a local decoder 10, the output signal from the quantizer 3 is decoded for producing a local decoder output signal as a predicted output signal, which is then supplied to the adder 2 for subtraction from the input signal to derive the difference between the input and predicted signals, that is, the aforementioned error signal. The local decoder 10 is comprised of the multiplier 6 which has complementary operation to the quantizer 3, an adder 7 for adding the output of the multiplier 6 and the local decoder output, a delay circuit 8 for causing a delay of one sampling period in the output of the adder 7, and a coefficient multiplier 9 for multiplying an attenuation coefficient k to the output of the delay circuit 8.

In the above described adaptive differential PCM encoder, the adaptive operation of the adaptive algorithm block 4 is effected in the quantizer 3 and the multiplier 6 in such a manner that, in general, the larger the encoded output from output terminal 5, the larger the number of quantum level steps. With such adaptive operation, the large dynamic range signals of the high frequency range can be processed within a limited word bit length.

However, the adaptive operation has a disadvantage that trackability between the encoder and the decoder is considerably impaired in case of an error occurrence, and that the operation may be affected by error propagation which is the weak point of the differential PCM or the like, thus causing a great hindrance in practical utilization of the system.

This error propagation is hereafter explained.

Figure 4:
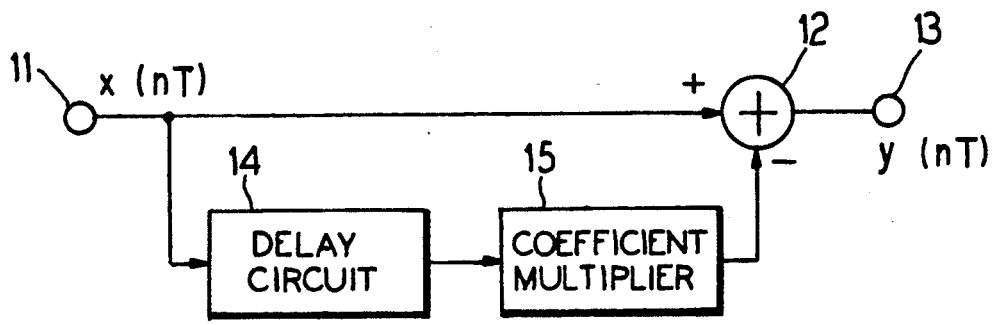
FIG. 4 is a block circuit diagram showing an example of the basic construction of the differential PCM encoder.

FIG. 4 shows in a block circuit the basic structure of the encoder for producing the aforementioned differential PCM data. The sampled wave peak value data are supplied to the input terminal 11 and thereafter to the adder 12 and the delay circuit 14. The input data are delayed by one sampling period Ts at the delay circuit 14 and the thus delayed data are supplied as subtractive input to the adder 12 through a multiplier 15 for multiplying the attenuation coefficient k. The output from the adder 12 is supplied to an output terminal 13 as the aforementioned differential PCM data.

When the wave peak values supplied to the input terminal 11 of FIG. 4 sequentially or at each sampling period are expressed as $W_0, W_1, W_2, \ldots$, the difference data $D_1, D_2, \ldots$ are given by $$D_1 = W_1 - k \cdot W_0$$
$$D_2 = W_2 - k \cdot W_1$$
$$\vdots$$

The attenuation coefficient k is selected so that $0 < k \leq 1$ and intended for reducing the effect of the past data so that the result of the error caused is not sustained for an infinite period of time. However, when the value of k is selected to a smaller value, the error propagation time may be reduced, but the effect in enlarging the dynamic range is lowered. Therefore, it is not desirable to select the value of k to too small.

Thus, in checking for the effect of the attenuation coefficient k on the dynamic range, the relation between the input x(nT) and the output y(nT) in FIG. 4 may be written as $$y(nT) = x(nT) - k \cdot x(nT - T) \quad (11)$$

where T represents the sampling period. With an input $e^{j\omega T}$, the equation (11) may be written as $$y(nT) = x(nT) - ke^{-j\omega T}x(nT) \quad (12)$$
$$= (1 - ke^{-j\omega T})x(nT)$$

and the transfer function $H(e^{j\omega T})$ is expressed as $$H(e^{j\omega T}) = 1 - ke^{j\omega T}$$

while the magnitude of the transfer function $|H(e^{j\omega T})|$ is expressed as $$|H(e^{j\omega T})| = |1 - ke^{j\omega T}| \quad (13)$$
$$= |(1 - k\cos\omega T) + jk\sin\omega T|$$
$$= \{(1 - k\cos\omega T)^2 + (k\sin\omega T)^2\}^{\frac{1}{2}}$$
$$= \{1 + k^2 - 2k\cos\omega T\}^{\frac{1}{2}}$$

If we let the input frequency be $f (= \omega i/2\pi)$ and the sampling frequency be $fs(= 1/Ts)$, $$\omega iTs = 2\pi fiTs \quad (14)$$
$$= 2\pi \frac{fi}{fs}$$

Thus, $$|H(e^{j\omega T})|_{fi} = \left(1 + k^2 - 2k\cos 2\pi \frac{fi}{fs}\right)^{\frac{1}{2}} \quad (15)$$

Normalizing the equation (15) with the magnitude of the transfer function for fi=0 (for direct current), we obtain $$G = \frac{|H(e^{j\omega T})|_{fi}}{|H(e^{j\omega T})|_{fi = 0}} \quad (16)$$
$$= \left\{\frac{1 + k^2 - 2k\cos 2\pi \frac{fi}{fs}}{1 + k^2 - 2k}\right\}^{\frac{1}{2}}$$

Figure 5:
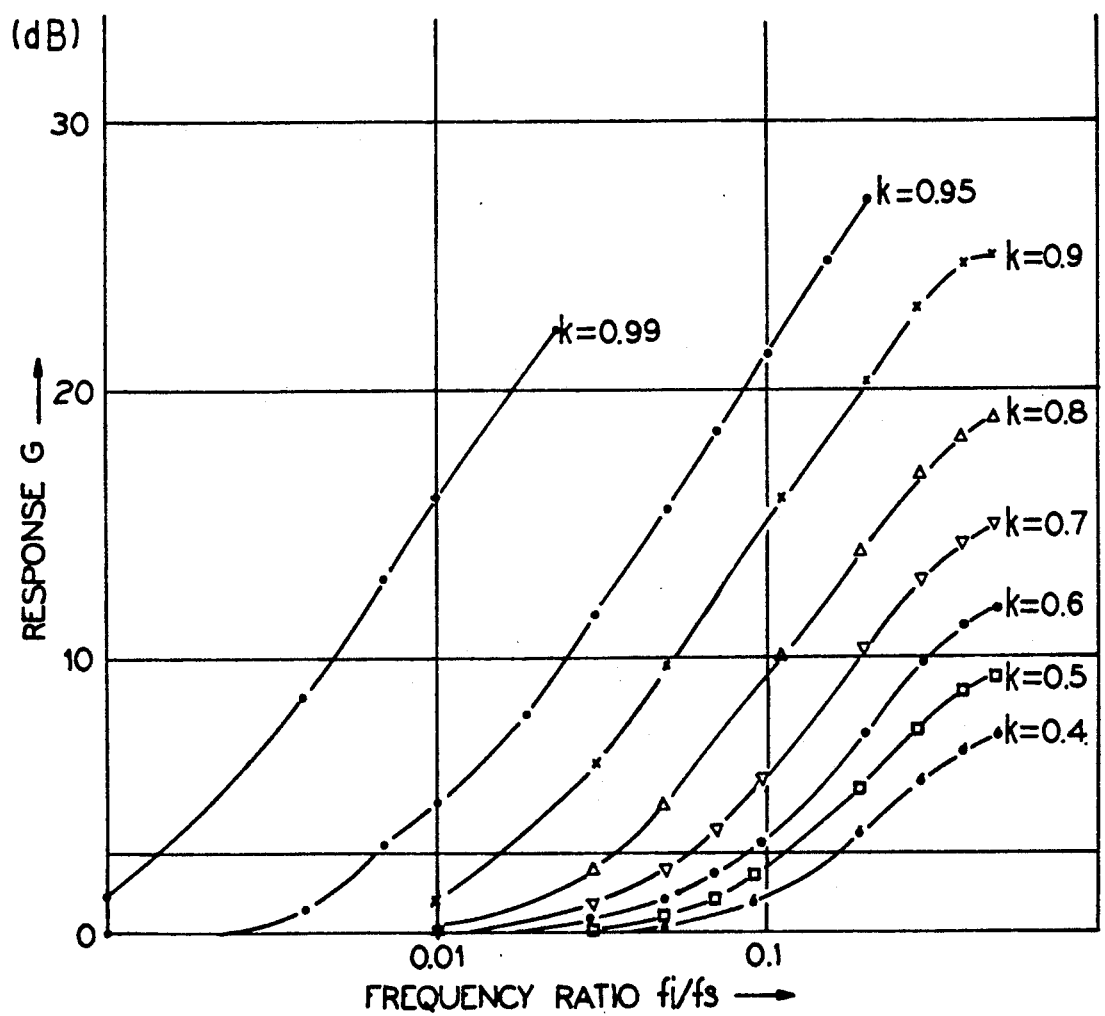
FIG. 5 is a chart showing frequency characteristics of the differential PCM transfer function with the damping coefficient as a parameter.

The relation between this G and the ratio fi/fs is shown in FIG. 5, with the values of k as parameter.

As may be seen from FIG. 5, the lesser the values of k, the higher the lower cut-off frequency and the lesser the increase in dynamic range in the low frequency range as compared to that in the high frequency range. Hence the value of k is desirably selected to be higher than e.g. 0.85, and thus a technology is demanded in which the error propagation time may be reduced for this value of k.

In the preferred embodiment of the present invention, the differential PCM data or the like are arranged in blocks each consisting of a predetermined number of words for minimizing the aforementioned error propagation time.

Figure 6:
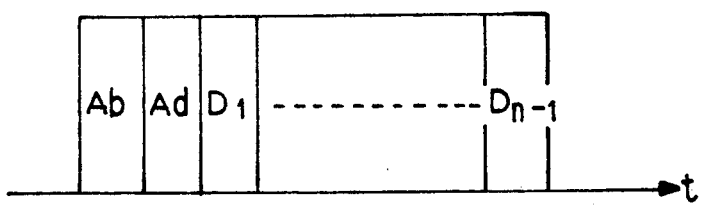
FIG. 6 is a diagram showing an example of the word construction in one block.

Thus, in FIG. 6, n-1 word data $D_1, D_2, \ldots, D_{n-1}$ of the aforementioned adaptively processed differential PCM data are arranged into one block, into which at least one word for the wave peak value data Ab (the straight PCM data) and at least one word for the adaptive processing information data Ad are also included so that a complete one block is composed of at least n+1 words. The bit lengths of these words may be different with the data types in such a manner that the data Ab for the wave peak or instantaneous value has 14 bits per word and each of the adaptively processed difference data $D_1$ to $D_{n-1}$ and the adaptive data Ad has 7 bits per word. Also, in selecting and transmitting the straight PCM, differential PCM or additive PCM data, it is only necessary that the straight PCM data (wave peak value data), differential PCM data or additive PCM data be introduced into the above described respective word positions of the difference data $D_1$ to $D_{n-1}$ and the word indicative of the selected mode be included in each block.

Figure 7:
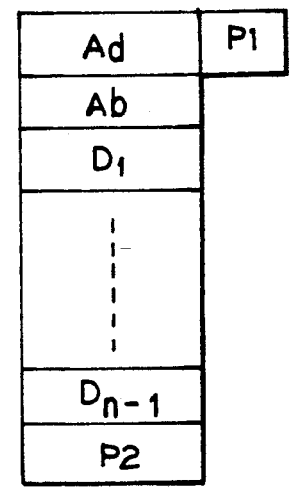
FIG. 7 is a diagram showing an example of the code construction for transmission of the one-block data.

The data Ad of the adaptive information word in the block is used in conjunction with all of the adaptively processed data words in the block, such as the difference data $D_1$ to $D_{n-1}$, as shown in FIG. 6. In this case, because the adaptive information is distributed separately in the data sequence, the total number of bits may be reduced in transmitting the adaptively processed data as compared to that achieved in the conventional practice in which the adaptive information is annexed to each word. In addition, even in instances where only the adaptive information is constructed in a code which has a higher error corrective ability, an increase in redundancy as a whole may be avoided. Such code construction is shown as an example in FIG. 7. In FIG. 7, the parity data $P_1$ is used for parity check only of the adaptive information Ad, while the parity data $P_2$ is used for parity check of all the data, that is, the adaptive information Ad, instantaneous wave peak value data Ab, and the differential PCM data $D_1$ to $D_{n-1}$ for one block. When a mode selection data is to be included for the selective transmission of one of the straight PCM, differential PCM and additive PCM modes, it may be arranged in two bits for selecting one of the three modes; however, it may be arranged in a 6-bit word for the inclusion of the mode selection data for the preceding and following blocks.

By arranging a plurality of words in one block in this manner, the error propagation time may be reduced for larger values of k. Comparison is now made between the error propagation time of one bit error during transmission for the case in which the differential PCM data are arranged in the block form and that for the case in which the data are not arranged in the block form. With the sampling frequency fs=32 kHz and the attenuation coefficient k=0.99, in order that the error caused in the differential PCM data transmission in the non-block form be reduced to 1 percent of the original error value, it is necessary that the time equal to n sampling periods, where n is a figure satisfying the relation $0.99^n \leq 0.01$, be elapsed, even when the effect of the error proper to the adaptive operation is disregarded. The value of n is more than 459, and the error propagation time nTs (Ts=1/fs=0.315 milliseconds) is then given by nTs≈14.3 milliseconds. In contrast thereto, when e.g. 32 words are arranged in one block, the effect of the error is reduced to zero in a shorter time of the order of about 1 millisecond, because the error propagation is terminated within one block. Thus, as shown in FIG. 5, the dynamic range for the low frequency area may be selected to a large value, and a more intensive adaptive operation may be adopted, without the need to reduce the attenuation coefficient k.

In this arranging the data in the block form, according as the maximum absolute value of the one-block word becomes least for the straight PCM, differential PCM or additive PCM modes, let us examine the condition under which, we can determine in which frequency range exists the critical portion of the signal frequency spectrum for each block, or in which of these modes the compression rate becomes maximum.

Figure 8:
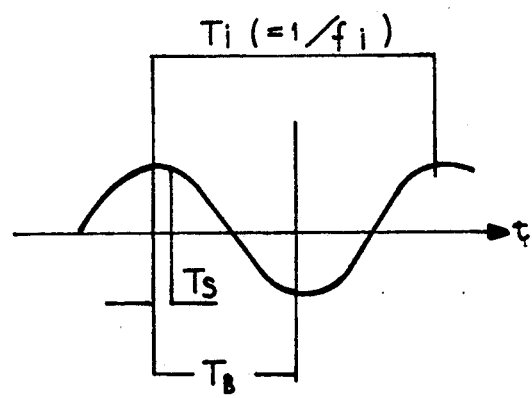
FIGS. 8 and 9 are charts showing the magnitude relation between the maximum value of the straight PCM data and the maximum value of the differential PCM data as a function of the number of words in one block.

Let the input signal be a sinusoidal signal with a frequency fi, the number of words per block be N, and the block period be $T_B$. Referring to FIG. 8, when the block period $T_B$ is larger than one half the period Ti (=1/fi) of the input signal, the maximum absolute value in one block of the straight PCM mode is approximately equal to the amplitude (zero to peak value) of the input signal. Since the number N of words in one block is given by $T_B/T_s$ where Ts represents the sampling period, provided that the number N of words in one block is such that an equation $$N = \frac{T_B}{T_s} \geq \frac{T_i}{2T_s} = \frac{fs}{2fi} \qquad (17)$$

is satisfied, the maximum absolute value in one block of the straight PCM mode is nearly equal to the amplitude of the input signal, and the maximum absolute value in one block of the differential PCM mode becomes smaller than that of the straight PCM mode for the frequency range such that fi<fs/6. When the number N of words is such that it does not satisfy the above equation (17), the maximum absolute value in one block of the straight PCM mode may be lowered to be less than the maximum absolute value in one block of the differential PCM mode. However, it can be demonstrated that such value of N is less than 3 as follows.

Figure 9:
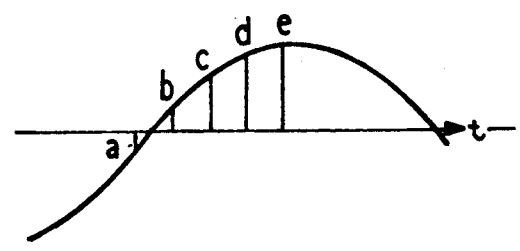

Thus, referring to FIG. 9, in which the sampling points a, b, c, . . . of the input sinusoidal wave are taken on the time axis and the points a, b are equally spaced apart on the time axis from the zero crossing of the input sinusoidal wave so that these points a, b afford the maximum difference values, an absolute value of the difference Dab between the points a and b is given by $$Dab = 2\sin 2\pi fi \cdot \frac{1}{2fs} \qquad (18)$$

Let N sampling points be included in one block, starting from the point a. In this case, the maximum absolute value L in one block is given by $$L = \sin 2\pi fi \cdot \frac{(N-2) + \frac{1}{2}}{fs} \qquad (19)$$

From these equations (18) and (19), the value of N such that Dab=L is found in a domain $$N < \frac{fs}{2fi} \;;$$

Thus, we obtain $$N = 2.5$$

Since N needs be an integer, when N is equal to or larger than 3, the maximum absolute value in one block is smaller for the differential PCM mode than that for the straight PCM mode for the frequency range of fi<fs/6, even in instances where N is less than fs/2fi. Thus the relative height of the input signal frequency can be determined by comparing the maximum absolute values in one block between the aforementioned respective modes, for example, between the straight PCM and difference PCM modes.

Figure 10:
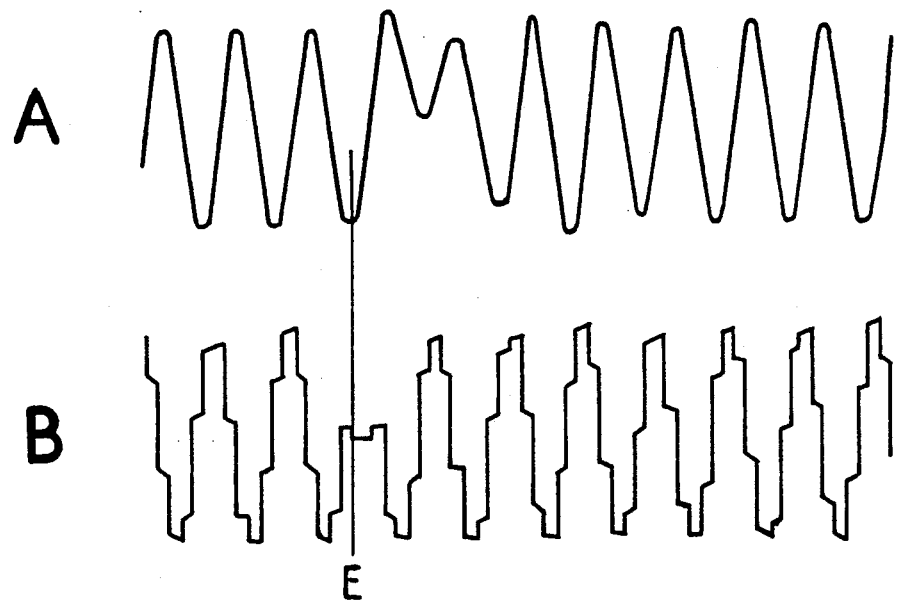
FIGS. 10 and 11 are time charts for explanation of the effect of bit error in the straight and differential PCM modes.
Figure 11:
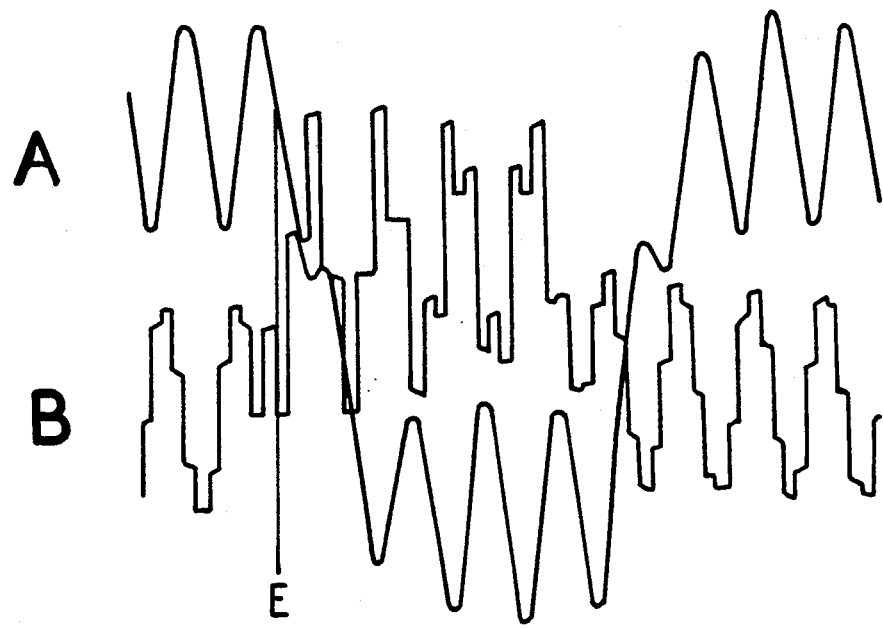

In addition, by selecting and switching to the optimum mode per block, it becomes possible to prevent error propagation such as that encountered for the high frequency range in the differential PCM mode in the conventional system. In FIGS. 10, 11, there are shown in waveform diagrams the effect of bit error occurrence for the straight PCM mode data transmission (FIG. 10) and the differential PCM mode data transmission (FIG.

11), with the input signal frequency fi=10 kHz and the sampling frequency fs=32 kHz, that is, with fi>fs/6. FIGS. 10B, 11B show the signal waveforms after digital to analog conversion on the receiving (or reproducing) side, while FIGS. 10A, 11A show the signal waves of these digital to analog converted signals which are further derived through a low-pass filter. In FIGS. 10, 11, the bit error has occurred at point E along the time axis. It may be seen that the straight PCM mode (FIG. 10) is affected by the error to a less extent than the differential PCM mode (FIG. 11). Since the straight PCM mode is selected for fi>fs/6 in accordance with the present invention, the effect of bit error is lowered.

A preferred practical form of the present invention for realizing the above described technical concept is now explained by referring to the drawings.

Figure 12:
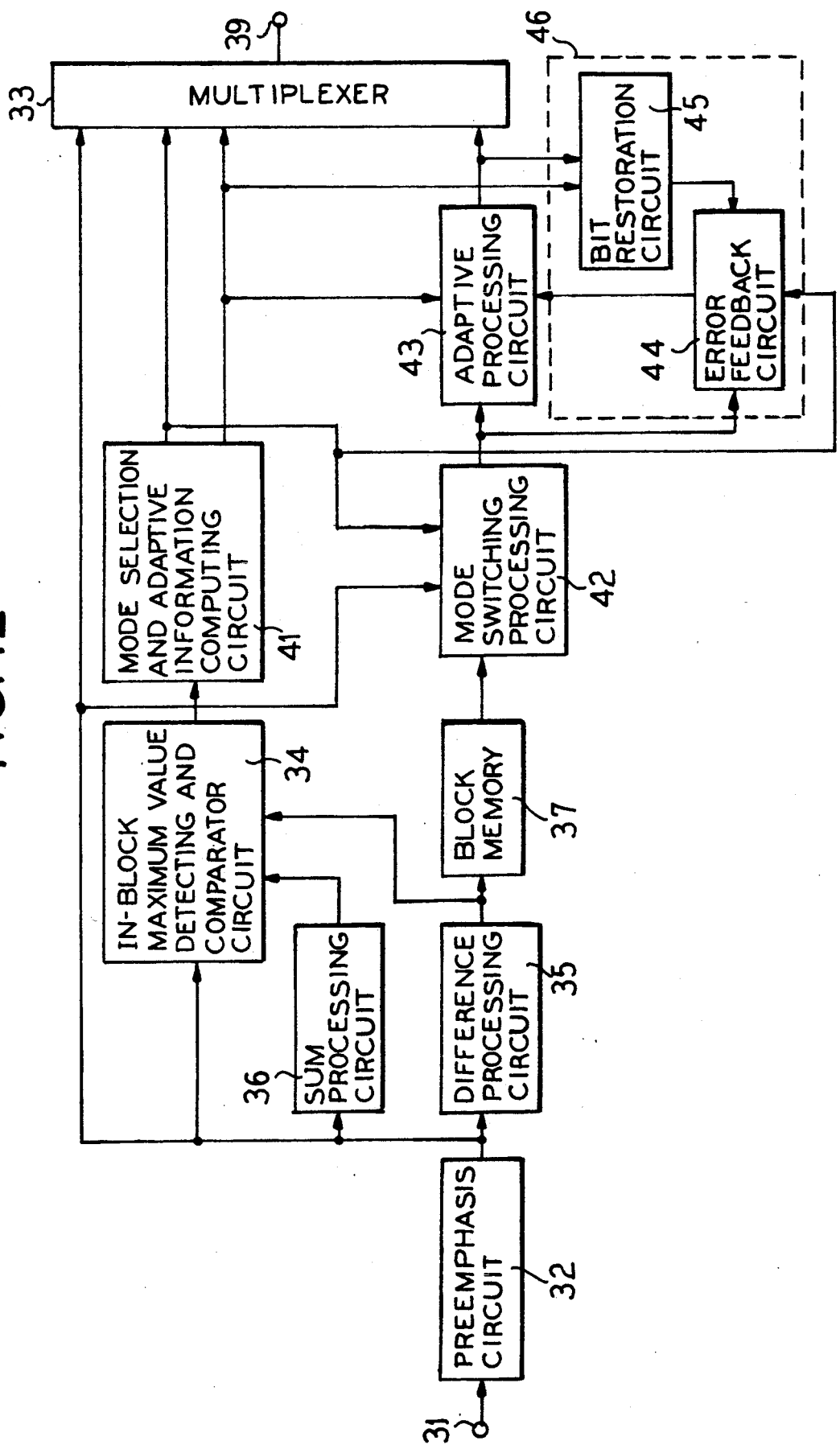
FIG. 12 is a block circuit diagram showing an example of an encoder circuit used in an embodiment of the present invention.

FIG. 12 shows in a block circuit diagram an example of a PCM encoder used for transmission of PCM signals.

In FIG. 12, the digital data signal (sampled wave peak value data signals) consisting of, for example, 14 bits are supplied to an input terminal 31 of the encoder. A preemphasis circuit 32 connected to this input terminal 31 has the time constant of, for example, 50 microseconds for emphasizing the high frequency range signals so as to increase the SN ratio. The output signals of, for example, 14 bits are supplied from the preemphasis circuit 32 to a multiplexer 33, an in-block maximum value detecting and comparator circuit 34, a difference processing circuit 35 and a sum processing circuit 36. In addition to the 14-bit sampling data signals from the preemphasis circuit 32, difference data signals of, for example, 15 bits from the difference processing circuit 35 and sum data signals of 15 bits from the sum processing circuit 36 are supplied to the detecting and comparator circuit 34. In the detecting and comparator circuit 34, the respective maximum absolute values of the above data each in one block (consisting of plural words) are detected and compared so that the mode which gives the least of these maximum values is selected as affording the most favorable compression efficiency. The processing circuit 35 has the basic construction similar to that shown in FIG. 4 and operates to sequentially take difference data of the adjacent words of the sampled data from the preemphasis circuit 32. Thus, when the n words $W_0, W_1, \ldots, W_{n-1}$ of the sampled wave peak value data corresponding to said one block are supplied to the circuit 35, n−1 differential PCM data words $D_1, D_2, \ldots, D_{n-1}$ such that $$D_1 = W_1 - k \cdot W_0$$
$$D_2 = W_2 - k \cdot W_1$$
$$\vdots$$
$$D_{n-1} = W_{n-1} - k \cdot W_{n-2}$$

where k is an attenuation coefficient such that $0<k\leq 1$, are supplied as output. These one-block differential PCM data $D_1, D_2, \ldots, D_{n-1}$ are sent to and stored in a block memory 37. The sum processing circuit 36 takes the sum of the aforementioned input wave peak value data and the input data earlier by one sampling period and multiplied by the attenuation coefficient k. Thus the n−1 sum data words $A_1$ to $A_{n-1}$ corresponding to the n wave peak value data are supplied for one block such that $$A_1 = W_1 + k \cdot W_0$$
$$A_2 = W_2 + k \cdot W_1$$
$$\vdots$$
$$A_{n-1} = W_{n-1} + k \cdot W_{n-2}$$

In the in-block maximum value detecting and comparator circuit 34, the maximum absolute values of the one-block word data for the respective modes, that is, the maximum absolute value of the straight PCM mode data $W_1$ to $W_{n-1}$ (wave peak value data), the maximum absolute value of the differential PCM mode difference data $D_1$ to $D_{n-1}$, and the maximum absolute value of the additive differential mode sum data $A_1$ to $A_{n-1}$ are detected, the respective maximum absolute values of these three modes are compared to each other, and the mode having the least of these maximum value is determined as the mode which provides the maximum dynamic range and the most favorable compression efficiency for the formentioned same number of bits. The corresponding mode information and the maximum absolute value for the mode are then supplied to a mode selection and adaptive information computing circuit 41. It should be noted that, in selecting the mode providing for the maximum compression efficiency, the mean energy for each of the three modes may also be compared to one another for evaluating the compression rate for these modes, besides or in place of comparing the maximum values for one block for the respective modes. When the input signal is a sinusoidal wave, a mode selection occurs in such a manner that the mode is switched to provide for the maximum dynamic range in dependence upon the frequency characteristics shown in FIG. 2.

Therefore, the in-block maximum value detecting and comparator circuit 34 may be said to have the function of sensing the frequency spectrum of the input signals so that it may be judged that the low to medium frequency signals are being supplied in case of the selection of the differential PCM mode, the high frequency signals are being supplied in case of the selection of the straight PCM mode, and that the higher frequency signals are being supplied in case of the selection of the additive PCM mode.

The mode selection and adaptive information computing circuit 41 outputs an information necessary for selecting the mode with the least of the maximum absolute values, or the mode with the maximum compression factor, and an adaptive information representative of the number of quantum steps. The mode selection information is supplied to a mode switching processing circuit 42 and the multiplexer 33, while the adaptive information is supplied to an adaptive processing circuit 43 for re-quantization and also to the multiplexer 33. To the mode switching and processing circuit 42 are also supplied the one-block difference data $D_1$ to $D_{n-1}$ stored in block memory 37. Thus the circuit 42 outputs the total one-block word data indicative of the mode selected in accordance with the above described mode selection information, that is, the data $W_1$ to $W_{n-1}$ in case of the selection of the straight PCM mode, the data $D_1$ to $D_{n-1}$ in case of the selection of the differential PCM mode or the data $A_1$ to $A_{n-1}$ in case of the selection of the additive PCM mode, these data being supplied to the adaptive processing circuit 43. The mode switching and processing circuit 42 may be operated in such a manner that the data of the selected mode are derived from the input one-block difference data $D_1$ to $D_{n-1}$ and the instantaneous wave peak value $W_0$ supplied from the preemphasis circuit 32. Thus the input data $D_1$ to $D_{n-1}$ may be outputted directly in case of the selection of the differential PCM mode. The difference processing may be cancelled by the additive processing in the case of the selection of the straight PCM mode. Thus the arithmetic operation $$W_1 = D_1 + k \cdot W_0$$
$$W_2 = D_2 + k \cdot W_1$$
$$\vdots$$
$$W_{n-1} = D_{n-1} + k \cdot W_{n-2}$$

is carried out in such case. Similarly, the additive operation may be carried out twice in case of the selection of the additive PCM mode. Thus the additive data $A_1$ to $A_{n-1}$ may be derived from the input data $D_1$ to $D_{n-1}$ and $W_0$ such that $$A_1 = W_1 + k \cdot W_0 = D_1 + 2kW_0$$
$$A_2 = W_2 + k \cdot W_1 = D_2 + 2kW_1$$
$$\vdots$$
$$A_{n-1} = W_{n-1} + k \cdot W_{n-2} = D_{n-1} + 2kW_{n-2}$$

The adaptive processing circuit 43 operates to requantize the in-block word data from the mode switching processing circuit 42 by using quantum steps related with the aforementioned maximum absolute value.

A concrete example of the adaptive operation is now explained. When the data from the mode switching and processing circuit 42 are represented as a 15-bit word and in two's complement form for instance, the most significant bit (MSB) stands for the positive or negative signal; thus the data is positive when the bit is '0' and negative when the bit is '1'. The in-block maximum value of the selected mode, which is obtained in the in-block maximum value detecting and comparator circuit 34, is an absolute value. Thus the value is same as the original data when the original data is positive, while it is represented in two's complement form when the original data is negative, so that the value is always the positive 15-bit value. The MSB for this maximum absolute value is always '0' and m+1 '1's are present from the MSB towards the LSB in dependence upon the magnitude (especially upon the number of actual digits in case of a binary representation), as shown in FIG. 13. Thus the practical number of digits of the maximum absolute value in FIG. 13 is 14−m which corresponds to the exponent in the floating decimal point notation. In the mode selection and adaptive information computing circuit 41, this number of continuous '0's from the MSB of the maximum absolute value, or m+1, is found and the value m is supplied as adaptive information to the adaptive processing circuit 43. In the circuit 43, the input 15-bit data is shifted by m bits towards left. Then 7 bits, for example, starting from and including the MSB of the thus shifted data, are taken as the significant number of digits, and are supplied to multiplexer 33.

The output data from the adaptive processing circuit 43 are the n−1 word data $X_1$ to $X_{n-1}$, with each word consisting for example of 7 bits. These data are produced as a result of the adaptive processing of the n−1 word data each consisting 15 bits, for example, i.e. the data $W_1$ to $W_{n-1}$ in the case of the selection of the straight PCM mode, the data $D_1$ to $D_{n-1}$ in the case of the selection of the differential PCM mode and the data $A_1$ to $A_{n-1}$ in the case of the selection of the additive PCM mode. When the original input 15-bit data is a positive number, more than m+1 bits from the MSB are continuously '0' as shown in FIG. 14A, so that the MSB of the 7-bit output data obtained by shifting the input data by m bits towards left is also '0' so as to indicate a positive number. When the original input 15-bit data is negative, more than m+1 bits from the MSB are continuously '1' as shown in FIG. 14B, so that the MSB of the 7-bit output data obtained by shifting the input data by m bits towards left is also '1' so as to indicate a negative number.

The adaptive processing circuit 43 is associated with a noise shaping circuit section 46 adapted for modifying the noise spectrum. The basic construction and the principle of operation of the noise shaping circuit section 46 will be described below in further detail. Briefly, the circuit section operates in such a manner that the error produced between the input and the output of the adaptive processing circuit 43 for re-quantizing is detected by an error feedback circuit 44 and fed back to the input of the adaptive processing circuit 43 with a delay equal to one sampling period so that the spectral components of the re-quantization noise are concentrated for example in the high frequency range. In view of the masking effect of the sense of hearing, it is desirable that the noise spectrum be coincident with the input signal spectrum as much as possible. In practice, the amount of error feedback is advisable to be larger for the mode which is selected the higher frequency range.

Since the output of the adaptive processing circuit 43 is compressed to 7 bits, a bit restoration circuit 45 is actually required for restoring the original 15 bits.

In the multiplexer 33, the instantaneous wave peak value data Ab supplied from the preemphasis circuit 32, the adaptive information data Ad and the mode selecting information data M each supplied from the mode selection and adaptive information computing circuit 41, and n−1 word data $X_1$ to $X_{n-1}$ supplied from the adaptive processing circuit 43 after adaptive processing and noise shaping are converted into chronological digital data so that the respective words is serially transmitted in the sequence shown for example in FIG. 15. It is seen from FIG. 15 that the mode selection data for three blocks, that is, the mode selection data M−1 for the processing block, the mode selection data $M_0$ for the currently transmitting block and the mode selection data $M_1$ for the ensuing block are transmitted as one word. Since the mode selection data for one block are transmitted three times, transmission errors may be prevented effectively.

The multiplexer 33, outputs serial data in units of blocks and in a word arranging order as shown in FIG. 15, with each block containing block sync, word sync and error correction code portions at an output terminal, so as to be transmitted via transmission line such as copper wires or optical fibers or recorded on a recording medium such as magnetic tape or disk, optical disk or semiconductor memory.

Figure 16:
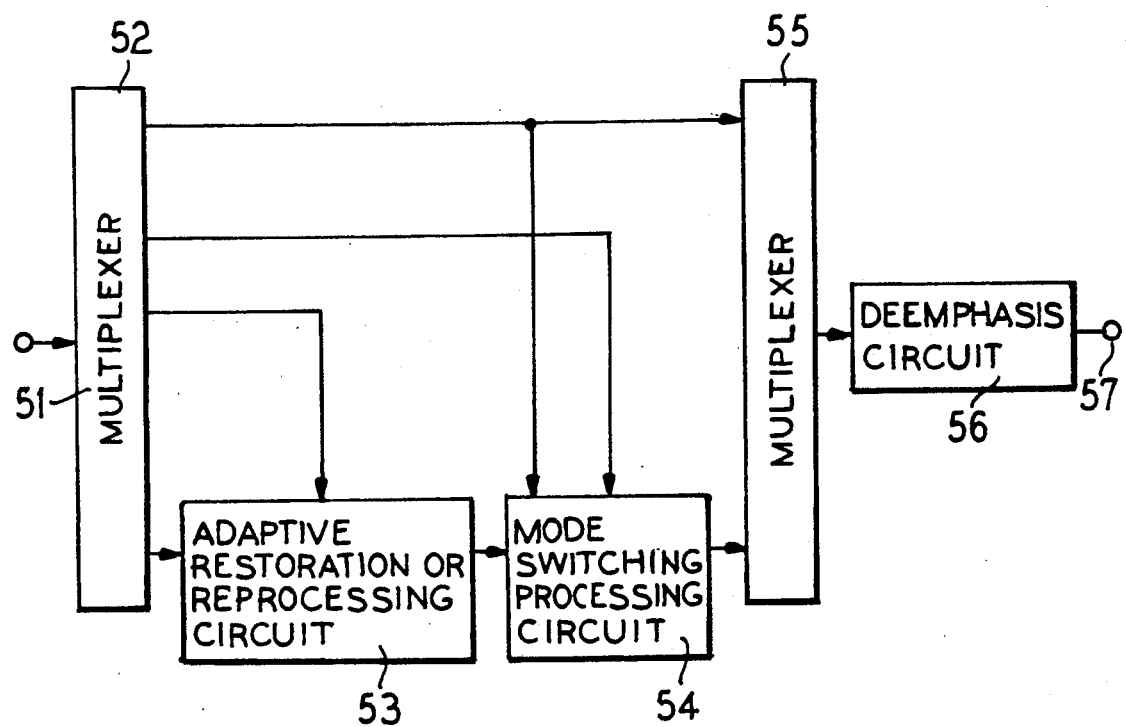
FIG. 16 is a block circuit diagram showing an example of the decoder circuit performing the reverse of the operation of the encoder shown in FIG. 12.

The digital signals thus serially transmitted in units of blocks may be reconverted into the original sampling wave peak value signals by a decoder, for example such as shown in FIG. 16.

In FIG. 16, the digital signals, each block of which has the word arrangement as shown in FIG. 15, are supplied from a transmission medium (including a recording medium) to a multiplexer 52 through input terminal 51. In the multiplexer 52, the aforementioned various data such as Ab, Ad, M and $X_1$ to $X_{n-1}$ are separated from each other on the basis of, for example, the block or word sync signals in the input digital signal, and the adaptively processed data $X_1$ to $X_{n-1}$ of the occasionally selected mode are supplied to an adaptive restoration or reprocessing circuit 53, where the adaptive restoration or reprocessing operation is performed on the basis of the adaptive information data Ad from multiplexer 52. For example, the MSBs of the 7-bit data $X_1$ to $X_{n-1}$ (indicating the sign) are expanded by m bits for providing m+7 bits, and 8−m invalid bits are added to follow the LSB, so that each resulting data is a 15-bit data in twos complement form. This 15-bit data, is specified by the mode selection data $M_0$ so as to be the data $W_1$ to $W_{n-1}$ when the selected mode is the straight PCM mode, the data $D_1$ to $D_{n-1}$ when the selected mode is the differential PCM mode, and similarly the data $A_1$ to $A_{n-1}$ when the selected mode is the additive PCM mode. The output data from the adaptive restoration or reprocessing circuit 53 are supplied to a mode switching processing circuit 54 where the data is processed in accordance with the prevailing mode selection data $M_0$ and reconverted into the aforementioned wave peak value data $W_1$ to $W_{n-1}$ which are then supplied to a multiplexer 55. The circuit 54 operates in such a manner that, when the input data is the straight PCM data $W_1$ to $W_{n-1}$, it is outputted as it is and, when the input data is the differential PCM data $D_1$ to $D_{n-1}$, it is converted into the data $W_1$ to $W_{n-1}$ by the additive operation as mentioned hereinabove. Similarly, when the input data is the additive PCM data $A_1$ to $A_{n-1}$, it is converted into data $W_1$ to $W_{n-1}$ by the differential or subtractive operation. During the additive and differential operations, the instantaneous wave peak value data Ab (=$W_0$) are also used.

The multiplexer 55, outputs the instantaneous wave peak value data Ab ($W_0$) from the multiplexer 52 in the input stage and the wave peak value data $W_1$ to $W_{n-1}$ from the mode switching and processing circuit 54 word by word and at e.g. a sampling frequency so that the n word data $W_0$ to $W_{n-1}$ are outputted sequentially at a block period. The output from multiplexer 55 is derived at an output terminal through deemphasis circuit 56 whose operation is the reverse of the operation of the preemphasis circuit 32.

In the above described embodiment of the present invention, since the plurality of words of the data to be transmitted are arranged in a block, error propagation can be terminated in a short time during the differential or additive PCM modes. In addition, since the attenuation coefficient k can be selected to a large value for the differential or additive processing to provide for more intensive adaptive operation, it is possible to transmit the adaptively processed differential or additive PCM digital signals with a larger dynamic range.

Figure 17:
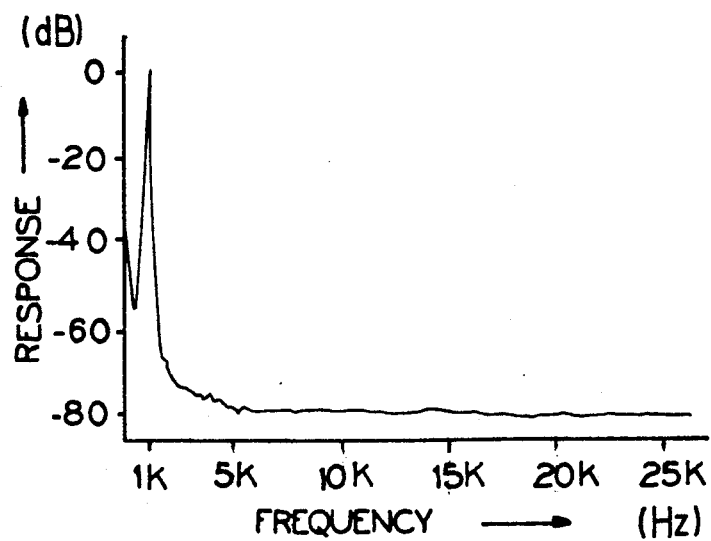
FIG. 17 is a chart showing frequency characteristics for the low frequency input signals in the adaptive differential PCM mode.
Figure 18:
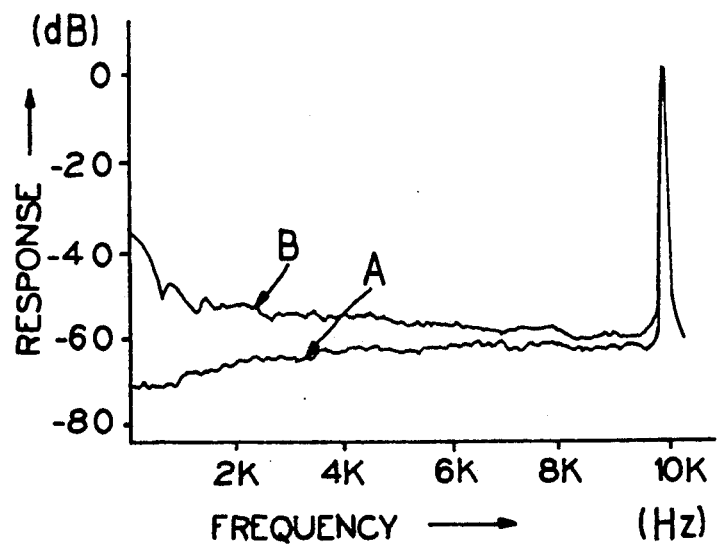
FIG. 18 is a chart showing frequency characteristics for the high frequency input signals in the straight and differential PCM modes.

Thus, referring to the instantaneous SN ratio, the differential PCM mode is selected for the low to medium input so that the larger dynamic range and the instantaneous SN ratio as high as 80 dB may be obtained as shown for example in FIG. 17. FIG. 17 shows the response at bandwidth of 200 Hz to the input signal with the sampling frequency $f_s$ of 32 kHz and the signal frequency $f_i$ of 1 kHz in full-bit input. The instantaneous SN ratio higher than 70 dB for higher than 2 kHz and the instantaneous SN ratio higher than 80 dB for higher than 5 kHz may be obtained even for transmission of the 7-bit words. The straight and additive PCM modes are selected respectively for the high frequency range and for the frequency range higher than or equal to $f_s/3$, respectively, for preventing error expansion and reduction in the instantaneous SN ratio which would otherwise be caused with the differential PCM mode. FIG. 18 shows a frequency characteristic curve A for the straight PCM mode and a frequency characteristic curve B for the differential PCM mode for $f_s$=32 kHz and $f_i$=10 kHz ($f_s/6 < f_i < f_s/3$), as an example. It will be seen from these curves A and B that an improvement by about 15 dB in the instantaneous SN ratio may be achieved at approximately 2 kHz with the straight PCM mode as contrasted to the differential PCM mode.

Figure 19A:
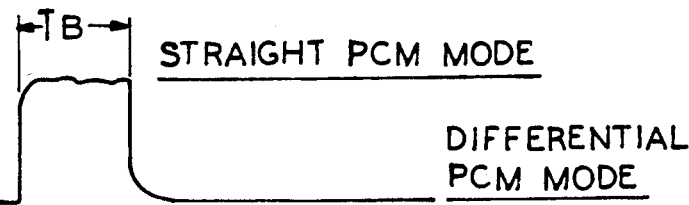
FIGS. 19 to 22 are time charts showing mode switching waveforms A with the input signal waveforms B.
Figure 19B:
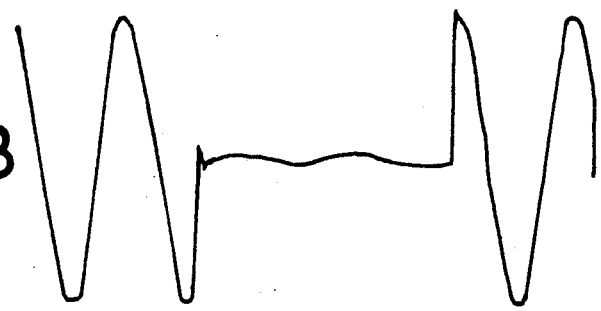
Figure 20A:
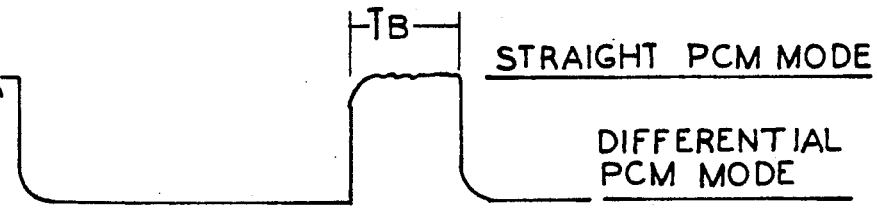
Figure 20B:
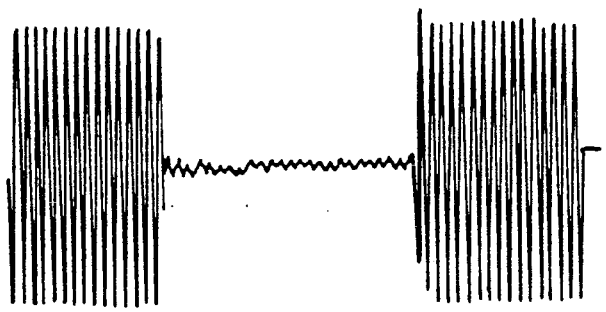
Figure 21A:
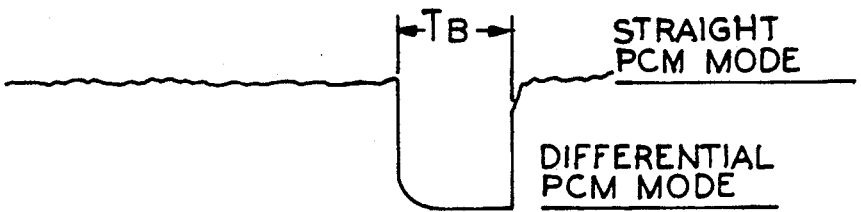
Figure 21B:
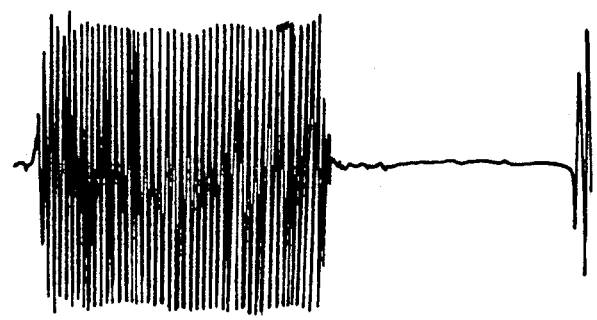
Figure 22A:
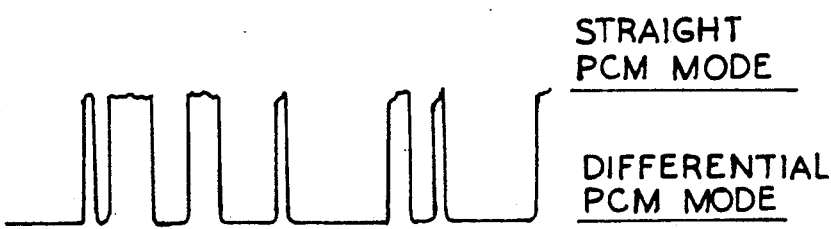
Figure 22B:
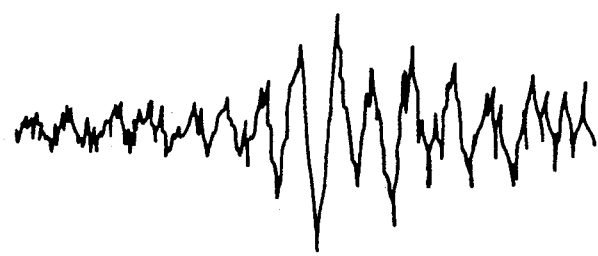

The optimum mode is selected in units of blocks in dependence upon changes in the input frequency. FIGS. 19 to 21 show the switching signal waveform A for the straight and differential PCM modes and the input signal (tone burst) waveform B. It will be seen that mode switching is effected as a function of the input signals. The carrier frequency of the tone burst input shown in FIG. 19 is 100 Hz, while the carrier frequency of that shown in FIG. 20 is 50 kHz, so that these frequencies are less than or equal to fs/6 ($\approx$53.3 kHz). However, switching is made for a one block period $T_B$ from the differential PCM mode into the straight PCM mode for reproducing the high frequency component caused by ringing at the rise time of the tone burst signal. Since the carrier frequency of the tone burst input shown in FIG. 21 is 5.55 kHz which is higher than or equal to fs/6, the straight PCM mode is selected as long as the burst signal persists, and is switched to the differential PCM mode when the burst signal has disappeared. FIG. 22 shows the mode switching waveform A for the input waveform B of the actual musical signals (in this case, the rock music), with the reduced time axis scale as compared to FIGS. 19 to 22. It is seen from these FIGS. 19 to 22 that sounds showing abrupt temporal changes and less waveform corelation factor, such as rising part of the sound from a musical instrument may be transmitted (occasionally recorded or reproduced) efficiently and with a lower bit rate. In this manner, the system may also be employed advantageously not only for communication, recording or reproduction in general, but as a sound source for electronic musical instruments.

Figure 23A:
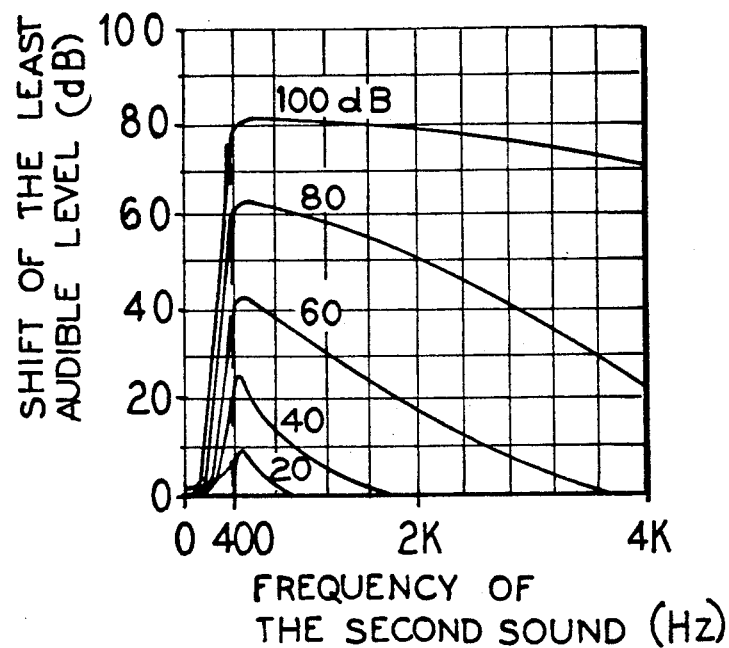
FIGS. 23A, B are charts for explanation of the masking effect of the pure sound with the pure sound.
Figure 23B:
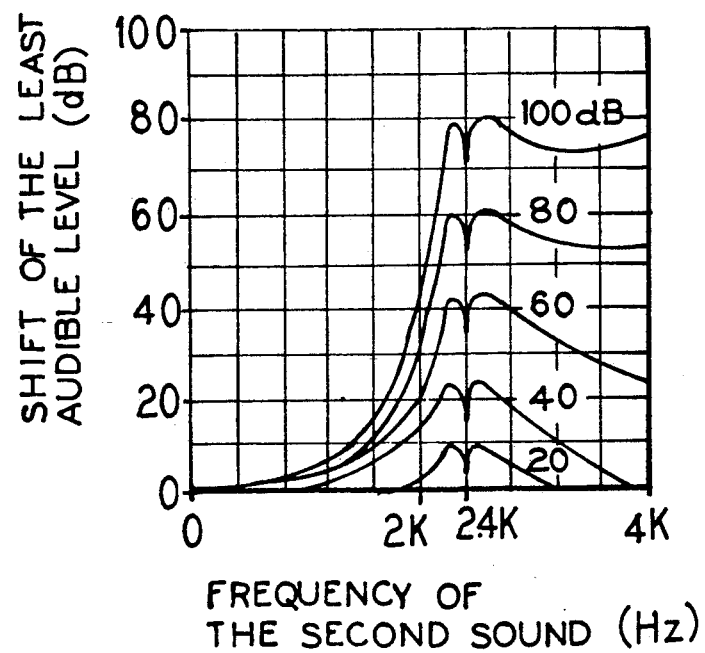

The masking effect and the noise shaping operation are hereafter explained:

FIGS. 23A, 23B show the masking effect of the pure sounds by the pure sounds, wherein the shift of the least audible level is plotted on the vertical axis (in dB) and the frequency of the second sound is shown on the horizontal axis (in Hz). In FIG. 23A, the first sound has a frequency of 400 Hz and in FIG. 23B, the first sound has a frequency of 2400 Hz. In both figures, the dB values entered in the neighborhood of the characteristic curves represent the sensitive level of the first sound. It is seen from FIG. 23A, B that a large masking effect may be obtained when the frequency of the first sound is close to that of the second sound.

Therefore, the noise shaping processing such that the critical portion of the noise spectrum be made to coincide with the critical portion of the input signal spectrum is effective to produce a considerable masking effect to improve the apparent SN ratio in hearing sense.

Figure 24:
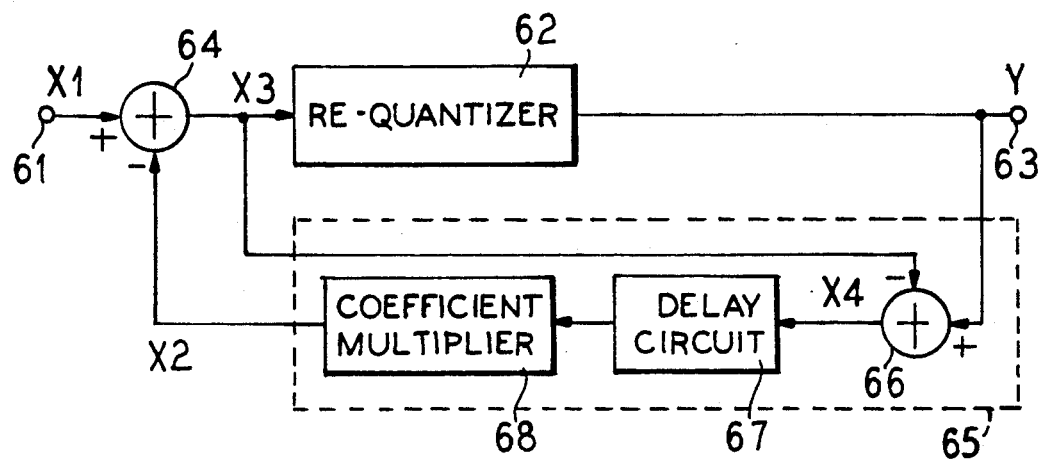
FIG. 24 is a block circuit diagram showing an example of the basic construction of the noise shaping circuit.

FIG. 24 shows an example of the basic construction of the noise shaping circuit wherein an error feedback is annexed to a main circuit in which the input $X_1$ supplied to an input terminal 61 is re-quantized by a re-quantizer 62 such as the aforementioned adaptive processing circuit so as to be supplied as the output Y to an output terminal 63. In FIG. 24, an adder 64 connected between the input terminal 61 and the re-quantizer 62 operates to subtract an output $X_2$ of an error feedback system 65 from the aforementioned input $X_1$. The error feedback system 65 is composed of a series connection of an adder 66, a delay circuit 67 for causing a delay of one sampling period, and a coefficient multiplier 68 for multiplication of the attenuation coefficient k. The adder 66 subtracts an output $X_3 (= X_1 - X_2)$ of the adder 64 from the output Y of the re-quantizer 62 to give an output $X_4$. After delayed by one sampling period at the delay circuit 67, the output $X_4$ is supplied to the multiplier 68 where it is multiplied by the attenuation coefficient k to give the output $X_2$ which is supplied to the adder 64.

In the above circuit, $$X_3 = X_1 - X_2 \quad (20)$$

$$X_4 = Y - X_3 \quad (21)$$

$$X_2 = k \cdot z^{-1} \cdot X_4 \quad (22)$$

Cancelling $X_2$ and $X_3$, $$Y - X_1 = (1 - kZ^{-1}) \cdot X_4 \quad (23)$$

$$|Y - X_1| = |1 - kZ^{-1}|^2 \cdot |X_4| \quad (24)$$

$$= |(1 - ke^{-j\theta})|^2 \cdot |X_4|$$

wherein $\theta = \omega Ts$ $$\therefore |Y - X_1| = (1 + k^2 - 2k\cos\omega Ts) \cdot |X_4| \quad (25)$$

$$= \left(1 + k^2 - 2k\cos 2\pi \frac{f}{fs}\right) \cdot |X_4|$$

Figure 25:
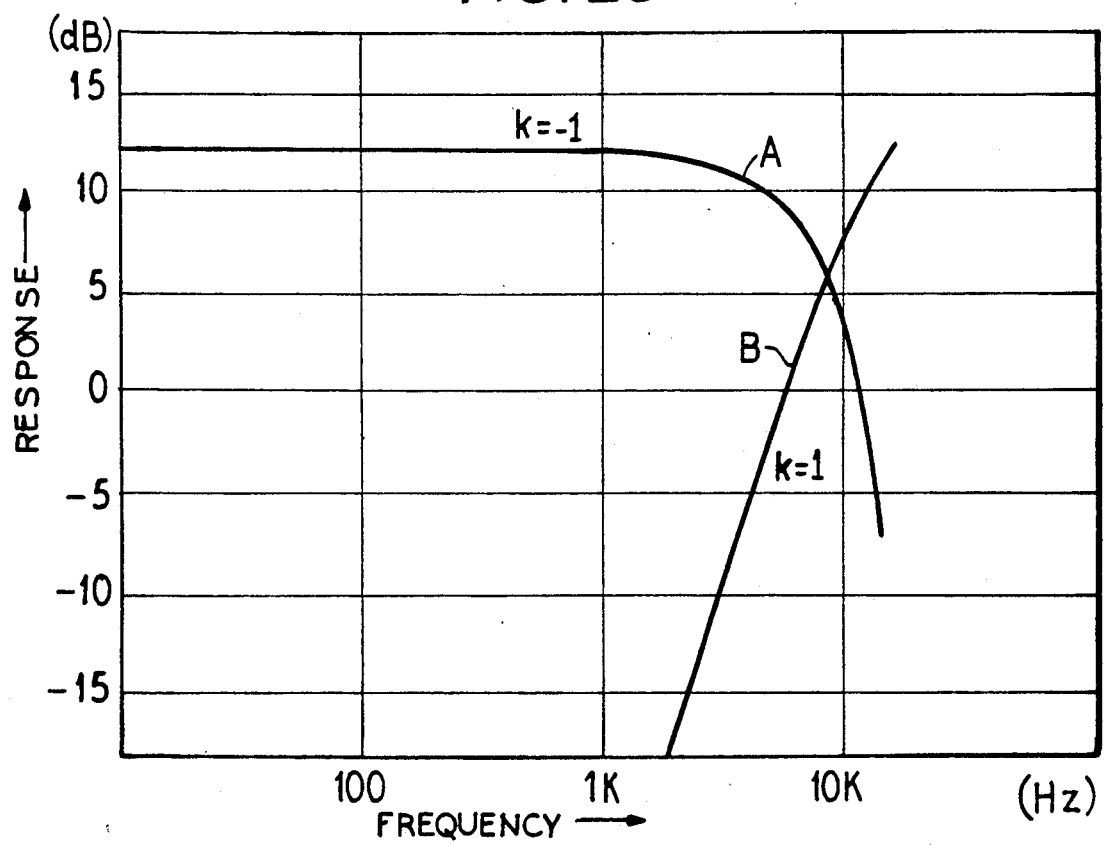
FIGS. 25 to 26 are charts for explanation of the changes caused in the noise spectrum as a result of noise shaping.

FIG. 25 shows the frequency/response of the noise shaping by the error feedback as mentioned hereinabove for $k = -1$ (curve A) and $k = 1$ (curve B).

As shown in FIG. 25, the noise spectrum is such that, for $k = 1$, the noise components are drastically reduced in the low to medium frequency range and concentrated in the high frequency range and, for $k = -1$, the noise components are decreased in the high frequency range and increased in the low to medium frequency range.

Figure 26:
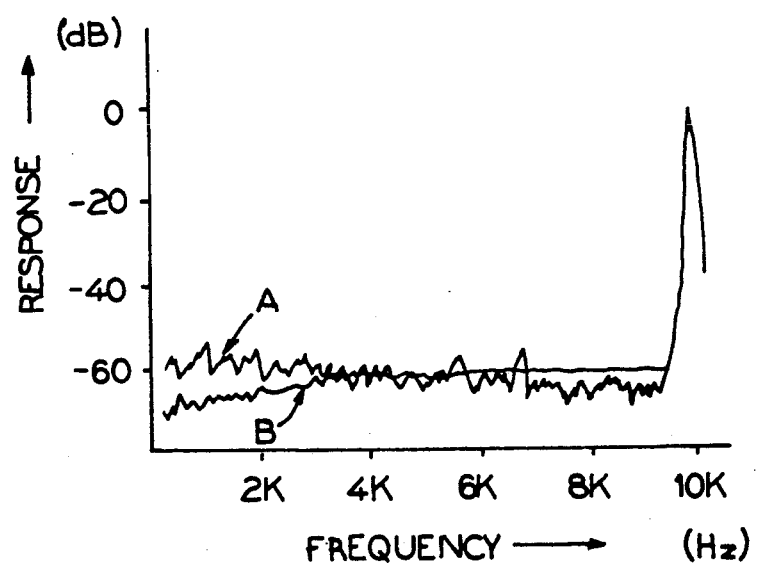

FIG. 26 shows the results of noise measurement in a practical circuit without noise shaping (curve A) and with noise shaping (curve B). It is apparent that the noise spectrum has been modified by the noise shaping.

Therefore, the noise spectrum can be modified if the amount and/or the sign of the error feedback in the noise shaping are modified in dependence upon the frequency spectrum of the input signals, more particularly, for instance upon the mode selection information as mentioned hereinabove. In short, the equivalent instantaneous SN ratio can be improved for the same energy level of the quantization noise by having the noise spectrum concentrated to the vicinity of the input signal spectrum to the greatest extent possible.

In this manner, in accordance with the present embodiment of the digital signal transmission apparatus of the present invention, it is possible to produce a larger masking effect with an improvement in the sensitive SN ratio by selecting the PCM mode suited to the input signal spectrum and by using a larger error feedback for a mode associated with a higher frequency.

Also, in accordance with the present embodiment of the present invention, error propagation for the differential or additive PCM modes can be terminated in a shorter time by arranging the plurality of words of the data to be transmitted in the block form. The attenuation coefficient k for the difference and sum processing can be selected to a larger value and a more intensive adaptive operation can be effected thus making possible an adaptive differential (or additive) PCM digital signal transmission with a larger dynamic range. The adaptive information need only be transmitted at the rate of one word per block so that a lower bit rate suffices. Thus the error corrective ability is markedly improved without any excessive increase in redundancy.

Also, in accordance with the embodiment of the present invention, the maximum values of the words contained in one block in each of various transmission modes such as the straight, differential and additive PCM modes are compared to one another for selecting the mode providing a larger compression, and the data of the thus selected modes are transmitted in units of blocks. In this manner, error propagation, degradation in the instantaneous SN ratio or increase in distortion factor may be reduced to provide for an improved transmission effect in the digital transmission system.

It is to be noted that the present invention is not limited to the above described specific embodiment, but may comprize various changes without departing from the purport of the invention.

In the digital signal transmission system of the present invention, a plurality of words e.g. of the adaptive differential PCM data are arranged into one block and the instantaneous wave peak value data word and the adaptive information word are included in each block. In this manner, error propagation can be terminated within each block and the attenuation coefficient can be selected to a larger value (close to unity) for preventing a decrease in the dynamic range. Also a more intensive adaptive operation may be performed to permit digital signal transmission in the adaptive differential PCM mode with a larger dynamic range. In addition, each one word of the instantaneous wave peak value data word and each one word of the adaptive information word are included in each block (consisting of plural words) so that the rate of the increase in the total number of bits is lowered even when only the peak wave value and adaptive information word data are of the code structure having the elevated error corrective ability and thus the error corrective ability may be improved with a lower redundancy.

In accordance with the digital signal transmission system of the present invention, the various transmission modes such as the straight PCM, differential PCM or the additive PCM modes are selectively used by switching in such a manner that the selected mode exhibits the largest compression rate for the prevailing input frequency so that merits or demerits of these transmission modes may be displayed or cancelled to the greatest extent possible. For example, the inconvenience that the error propagation or degradation in the instantaneous SN ratio is increased in the high frequency range in the differential PCM mode, which makes it possible to effectively transmit with a large dynamic range in the low to medium frequency range may be subsequently dissolved by switching to the straight or additive PCM modes in case the input signal frequency is shifted to the higher frequency range. Also, in accordance with the digital signal transmission system of the present invention, the apparent or sensitive noise reduction may also be achieved by having the quantization noise spectrum modified in accordance with the frequency spectrum of the input signal to provide for the maximum masking effect.

What is claimed is:

1. A method for transmitting digital signals comprising the steps of:
   receiving input digital data including a first series of sampled waveform value data;
   producing at least one of a second series of difference value data as differential PCM mode digital data and a third series of sum value data as additive PCM mode digital data from said series of sampled waveform value data;
   comparing, for each of successive predetermined periods, the maximum value of at least two of said first, second and third series, said maximum value being defined by the sample maximum of said first series, the maximum difference value of said second series, and the maximum addition value of said third series;
   selecting the one of said first, second and third data series which provides the least maximum value thereof for each said predetermined period;
   producing mode signal data indicating the selected data series; and
   transmitting the selected data series together with said mode signal data.

2. Apparatus for transmitting digital signals comprising:
   means for receiving input digital data including a first series of sampled waveform value data;
   means for producing at least one of a second series of difference value data as differential PCM mode digital data and a third series of sum value data as additive PCM mode digital data from said series of sampled waveform value data;
   means for comparing each maximum value of at least two of said first, second and third data series for each of successive predetermined periods, said maximum value being defined by the sample maximum of said first series, the maximum difference value of said second series, and the maximum addition value of said third series;
   means for selecting the one of said first, second and third data series which provides the least maximum value thereof for each said predetermined period;
   means for producing mode signal data indicating the selected data series; and
   means for transmitting the selected data series together with said mode signal data.

3. A method for transmitting digital signals comprising the steps of:
   receiving an input signal;
   producing a predictive value signal responsive to said input signal;
   producing a differential signal from said input signal and said predictive value signal;
   providing said differential signal to a spectrum changing circuit means;
   obtaining an error component between the input and output of said spectrum changing circuit means; and
   feeding back said error component through error predicting means to the input side of said spectrum changing circuit means so as to control the frequency spectrum of the noise of said input signal to independently change the frequency spectrum of the noise with respect to the frequency spectrum of said input signal.

4. Apparatus for transmitting digital signals comprising:
   means for receiving an input signal
   means for producing a predictive value signal responsive to said input signal;
   means for producing a differential signal from said input signal and said predictive value signal;
   means for providing said differential signal to a spectrum changing circuit means;
   means for obtaining an error component between the input and output of said circuit means; and
   means for feeding back said error component through error predicting means to the input side of said spectrum changing circuit means so as to control the frequency spectrum of the noise of said input signal to independently change the frequency spectrum of the noise with respect to the frequency spectrum of said input signal.

5. A method for transmitting digital signals comprising the steps of:
   receiving input digital dta including a series of sampled waveform value data;
   producing a series of difference value data as differential PCM mode digital data and a series of sum value data as adaptive PCM mode digital data from a plurality of sampled waveform value data adjacent to each other in time in said series of the sampled waveform value data, respectively;
   producing a plurality of words of the digital data by adaptive processing either said series of difference value data or sum value data included in every predetermined period; producing information signal data indicating the adaptive processing taken in every predetermined period; and transmitting the adaptive processed plurality of words of the digital data together with said information signal data and at least one of said plurality of sampled waveform value data.

6. An apparatus for transmitting digital signals comprising:
   means for receiving input digital data including a series of sampled waveform value data;
   means for producing a series of difference value data as differential PCM mode digital data and a series of sum value data as additive PCM mode digital data from a plurality of samples adjacent to each other in time in said series of the sampled waveform value data, respectively;
   means for producing a plurality of words of the digital data by adaptive processing either said series of difference value data or sum value data included in every predetermined period;
   means for producing information signal data indicating the adaptive processing taken in every predetermined period; and means for transmitting the adaptive processed plurality of words of the digital data together with said information signal data and at least one of said plurality of sampled waveform value data.

7. A method for transmitting digital signals comprising the steps of:
receiving an input signal;
producing a predictive value signal from said input signal;
producing a differential signal between said input signal and said predictive value signal;
providing said differential signal to a circuit means for changing the frequency spectrum of the signal;
obtaining an error component between the input and output of said circuit means; and
feeding back said error component through error predicting means to the input side of said circuit means so as to control the frequency spectrum of the noise of said input signal to independently change the frequency spectrum of the noise with respect to the frequency spectrum of said input signal.

8. An apparatus for transmitting digital signals comprising:
means for receiving an input signal;
means for producing a predictive value signal from said input signal;
means for producing a differential signal between said input signal and said predictive value signal;
means for providing said differential signal to a circuit means for changing the frequency spectrum of the signal;
means connected to said circuit means for obtaining an error component between the input and output of said circuit means; and
means for feeding back said error component through error predicting means to the input side of said circuit means so as to control the frequency spectrum of the noise of said input signal to independently change the frequency spectrum of the noise with respect to the frequency spectrum of said input signal.

9. A method for transmitting digital signals comprising the steps of:
receiving input digital data including a first series of sampled waveform value data;
producing a second series of difference value data as differential PCM mode digital data, and producing a third series of sum value data as adaptive PCM mode digital data, from a plurality of consecutive sampled waveform value data in said series of sampled waveform value data;
producing a plurality of words of digital data by adaptively processing of a single selected one of said first, second or third series, for each of a plurality of consecutive predetermined periods;
producing an information signal data for determining said single selected series taken in each said predetermined period; and
transmitting said plurality of words together with said information signal data and at least one of said plurality of sampled waveform value data.

10. Apparatus for transmitting digital signals comprising:
means for receiving input digital data including a first series of sampled waveform value data;
means for producing a second series of difference value data as differential PCM mode digital data, and producing a third series of sum value data as additive PCM mode digital data, from a plurality of consecutive samples in said first series of sampled waveform value data;
means for producing a plurality of words of digital data by adaptively processing a single selected one of said first, second or third series, for each of a plurality of consecutive predetermined periods;
means for producing information signal data indicating said single selected series in each said predetermined period; and
means for transmitting said plurality of words together with said information signal data and at least one of said plurality of sampled waveform value data.

11. A method for transmitting digital signals comprising the steps of:
receiving input digital data including a series of sampled waveform value data;
producing at least one of a series of difference value data as differential PCM mode digital data and a series of sum value data as additive PCM mode digital data from said series of sampled waveform value data;
detecting the maximum difference value of said differential PCM mode data and the maximum addition value of said additive PCM mode data;
comparing all of said maximum values in every predetermined period;
selecting one of said data series which provides the least of the maximum values thereof among said series of the sampled waveform value data, difference value data and sum value data every said predetermined period;
producing mode signal data indicating said selected one data series; and
transmitting the selected data series together with said mode signal data.

12. An apparatus for transmitting digital signals comprising:
means for receiving input digital data including a series of sampled waveform value data;
means for producing at least one of a series of difference value data as differential PCM mode digital data and a series of sum value data as additive PCM mode digital data from said series of sampled waveform value data;
means detecting the maximum diffference value of said differential PCM mode data and the maximum addition value of said additive PCM mode data and for comparing all said maximum values in every predetermined period;
means for selecting one data series which provides the least of the maximum values thereof among said series of the sampled waveform value data, difference value data and sum value data every said predetermined period;
means for producing mode signal data indicating the selected data series; and
means for transmitting the selected data series together with said mode signal data.

* * * * *